United States Patent Office 2,824,870
Patented Feb. 25, 1958

2,824,870

UREA-MODIFIED ALKALI METAL STARCH PHOSPHATES

Hans Neukom, Chicago, Ill., assignor to International Minerals & Chemical Corporation, a corporation of New York No Drawing. Application September 16, 1954
Serial No. 456,622

4 Claims. (Cl. 260—233.5)

This invention relates to modified starches and, more particularly, to the production of starch phosphates.

Starch, which is sold as a white powder, is utilized commercially as an additive for numerous products and imparts desired physical properties to such products, for example, the property of adhesiveness, water retention, viscosity or gelation. Because of its properties, starch is added to food products as a thickener, a stabilizer, a binder, or an extender. It is employed as a fiber coating for textiles, as a sizing agent in paper, as a slime inhibitor in ore flotation operations, and for many other uses.

Modified starch pastes are frequently employed instead of starch because the properties of certain modified starches are superior to those of untreated starch.

Starch phosphates, which are chemically modified starches, have been prepared by the reaction of starch and phosphorus oxychloride in the presence of a hydrogen chloride acceptor, usually pyridine. By this method and its modifications, the starch phosphates obtained are usually highly degraded or are cross-linked insoluble products. These processes are also unsatisfactory from a commercial standpoint because the procedures are complex and expensive to carry out.

It is an object of the instant invention to provide an improved process for the modification of starches.

It is a further object of the instant invention to provide a process for the production of improved modified starches.

It is a further object of the instant invention to provide a process for the production of alkali metal starch phosphates.

These and other objects of the instant invention will become more apparent from a more complete description of the invention given below.

It has been discovered that certain phosphate salts react with starch in the presence of urea when heated at an elevated temperature, that is, at a temperature between about 120° C. and about 175° C., to produce alkali metal starch phosphates capable of producing higher viscosity solutions than alkali metal starch phosphates prepared in the absence of urea.

In one embodiment of the instant invention, starch is soaked in an aqueous solution of an alkali metal phosphate and urea. The resulting soaked starch granules are then separated from the solution. The excess surface moisture is removed and the resulting material is heated at a temperature between about 120° C. and about 175° C. The heating is carried out at either atmospheric pressure or under vacuum. The reaction temperature is preferably between about 140° C. and about 170° C. Temperatures higher than about 175° C. are generally avoided because of the tendency of the starch to break down. At temperatures below about 120° C. the reaction is too slow to be commercially feasible.

In carrying out the instant invention, the phosphate salt or salts are utilized in an aqueous solution having a pH between about 3.0 and about 8.0. The phosphates which may be employed include sodium, potassium, and lithium phosphates. The phosphate salt is dissolved in water to produce a solution having a pH between about 3.0 and about 8.0 or a combination of phosphate salts are dissolved in water in such proportion that the resulting solution has a pH between about 3.0 and about 8.0 and reacted with the starch in the presence of urea. For example, monosodium phosphate and disodium phosphate may be combined in an aqueous solution in such proportion that the resulting phosphate solution has a pH between about 3.0 and about 8.0. Phosphate salts also may be formed in situ in the solution. For example, a phosphate solution is prepared by dissolving a basic phosphate salt, such as trisodium phosphate, in water and adjusting the pH of the solution with phosphoric acid between about 3.0 and about 8.0. Alternatively, an aqueous solution of an acidic phosphate salt or phosphoric acid is neutralized with sodium hydroxide, potassium hydroxide, or lithium hydroxide.

The starch phosphates of this invention are alkali metal starch phosphates containing at least about 0.2% bound phosphorus based on the weight of starch, and usually between about 1% and about 5% bound phosphorus based on the weight of starch. These alkali metal starch phosphates also contain between about 1 and about 2 moles of alkali metal per mole of bound phosphorus, and preferably between about 1.0 and about 1.7 moles of alkali metal per mole of bound phosphorus.

The amount of phosphorus introduced into the starch molecule in the form of phosphate is controlled by increasing or decreasing the concentration of the phosphate in the solution. The amount of phosphorus introduced into the starch molecule will desirably amount to at least 1% based on the weight of starch. The bound phosphorus is in the form of a phosphate group, or more particularly, an alkali metal phosphate group. Alkali metal starch phosphates of this invention containing between about 1% and about 5% chemically combined phosphorus in the form of phosphate are preferred as being more useful commercially than other alkali metal starch phosphates. An alkali metal starch phosphate containing between about 3% and about 5% phosphorus based on the weight of starch is preferred as having particularly desirable properties.

Treatment of starch with a 1 molar alkali metal starch phosphate solution having a pH between about 3.0 and about 8.0 under the conditions of this invention will produce an alkali metal starch phosphate containing about 1% bound phosphorus in the form of phosphate based on the weight of the starch if the reaction is allowed to go to completion. Utilizing more concentrated alkali metal phosphate solutions, there may be prepared alkali metal starch phosphates containing greater quantities of bound phosphorus. Alkali metal starch phosphates containing at least 1% bound phosphorus by weight and prepared in accordance with this invention utilizing an alkali metal phosphate solution having a pH between about 4.0 and about 7.0 are cold-water swelling starch phosphates which find utility in a great many applications.

In preparing the alkali metal starch phosphate compounds of this invention, it is convenient to first prepare an aqueous alkali metal phosphate solution, preferably a solution having a molarity with respect to phosphate ion of between about 1 and about 3. Urea is added to the phosphate solution in an amount such that the solution will contain between about 2% and about 5% urea by weight. Starch is then added to the phosphate solution in an amount which will permit the formation of a slurry. Generally, the amount of starch will amount to less than 1½ times the weight of the water present in the alkali metal phosphate solution. The resulting slurry is agitated for at least about 5 minutes, suitably between about 5 minutes and about 60 minutes, usually about 10 minutes, to permit the starch granules to become soaked with the phosphate solution.

The swollen starch granules are separated from the phosphate solution, for example, by filtration, and excess surface moisture is removed, for example, by drying in air or heating at a temperature below the point at which starch gelatinizes, for example, at a temperature below about 45° C., depending upon the particular starch. The resulting granules which generally contain between about 8% and about 15% moisture content are then heated to a temperature between about 120° C. and about 175° C. for between about 1 hour and about 15 hours. Longer periods of heating are employed where the lower temperatures in the above range are used. Generally, about 4 hours heating is sufficient time for the reaction to proceed to substantial completion when a temperature between about 140° C. and about 170° C. is employed.

In a specific embodiment of the instant invention, starch is admixed with an aqueous alkali metal phosphate solution containing between about 2.5% and about 43% alkali metal phosphate by weight and between about 2% and about 5% urea by weight. The solution is prepared by dissolving urea and an alkali metal phosphate, such as monosodium phosphate or disodium phosphate, or a combination of monosodium and disodium phosphate, in water and if the pH is not in the range of between about 4.0 and about 7.0, adjusting the pH of the resulting solution to this pH range with an appropriate reagent, such as phosphoric acid or an alkali metal hydroxide. The phosphate solution preferably contains between about 12% and about 36% alkali metal phosphate, that is, the phosphate solution preferably has a molarity with respect to the phosphate ion of between about 1 and about 3.

The resulting slurry is agitated for about 10 minutes to permit the starch granules to become soaked with the phosphate solution. The swollen granules are then separated from the phosphate solution, for example by filtration, and excess moisture is removed by drying in air at a temperature below the starch gelatinization temperature. The resulting granules are then heated at a temperature between about 140° C. and about 170° C. until the reaction between the alkali metal phosphate and the starch has proceeded to substantial completion. The resulting product is an alkali metal starch phosphate compound.

In accordance with a preferred embodiment of this invention, wheat starch is admixed with a 2 molar aqueous solution of an alkali metal phosphate, the solution also containing between about 2% and about 5% urea by weight. The urea-alkali metal phosphate solution is prepared by dissolving ⅔ of a mole of monosodium phosphate monohydrate and 1⅓ moles of disodium phosphate dodecahydrate in sufficient water to make a solution which was 2 molar with respect to the phosphate ion. Urea is then added to the 2 molar phosphate solution in an amount to produce a solution containing about 2% and about 5% urea. The amount of starch utilized is about equal to the weight of the phosphate solution. Admixing the starch with the phosphate solution produces a slurry, and the slurry is stirred for about 10 minutes to permit the starch granules to become soaked with the phosphate solution. The swollen granules are separated from the phosphate solution by filtration and excess surface moisture is removed by drying in air. The resulting granules are then heated at a temperature between about 140° C. and about 170° C. for about 5 hours, which time is sufficient for the reaction between the starch and the alkali metal phosphate to proceed to substantial completion. The alkali metal starch phosphate prepared in accordance with this preferred embodiment will contain between about 3% and about 4% bound phosphorus, in the form of phosphate, based on the weight of starch.

The instant process is applicable to root starches, such as potato starch, tapioca starch; cereal starches, such as amioca starch, corn starch, wheat starch, etc., and their modification products, for example acid modified, oxidized, cross-linked starches, or starch derivatives.

The alkali metal starch phosphates prepared in accordance with the instant invention may be altered in properties by controlling reaction conditions and the amount of phosphorus introduced into the starch molecule. The molecule size of the alkali metal starch phosphates can be varied within a wide range by carrying out the phosphorylation under conditions which promote or inhibit degradation reactions. Degradation of the starch is promoted by increasing the amount of phosphate or by employing a higher temperature or by using phosphate solutions with low pH values. In this way a thick or a thin boiling alkali metal starch phosphate or a dextrin phosphate is produced.

The alkali metal starch phosphates produced in accordance with this invention produce 5% pastes, having viscosities of the order of 4,000 to 6,000 prior to cooking, and of the order of 15,000 to over 20,000 after cooking. By the term "cooking" is meant heating on a steam bath for at least about 10 minutes. The higher viscosities of the starch phosphate products of this invention permit the preparation of starch mixes having a given viscosity, utilizing less starch phosphate compound than when other starch compounds are utilized.

The alkali metal starch phosphates obtained by the practice of the instant invention have a number of properties which make them more useful than unmodified starches. Some of the important properties of the instant starch phosphates are: their solubility (swelling) in cold water, their stability in the form of pastes on prolonged standing, their resistance to bacteriological attack, and their controlled variability of viscosity for different uses.

Generally, pastes prepared from cereal starches have a tendency to set to opaque unworkable gels when they cool. The alkali metal starch phosphates prepared according to the instant process form stable pastes which do not gel upon standing. In addition, these pastes are much clearer than those prepared from corresponding unmodified starches.

Alkali metal starch phosphate films may be cast from cooled solutions of the phosphates, and the films are transparent, flexible and water soluble.

Because of these properties of the alkali metal starch phosphates, they are useful as sizing agents in the surface finishing of paper, as a beater additive prior to the paper mat formation in paper making, as a water loss inhibitor in oil well drilling muds, as a core binder in the preparation of foundry cores, and as a thickening agent in food products, such as soups, ice cream, puddings, mayonnaise, salad dressing, pie fillings, and the like.

The following examples illustrate specific embodiments of the invention. All parts and percentages are by weight unless otherwise indicated.

*Example 1*

About 34.5 parts of monosodium phosphate monohydrate and about 67 parts of disodium phosphate heptahydrate were dissolved in 203.5 parts of water. The pH of the solution was 6.2. To this solution was added 15 parts of urea followed by 180 parts of wheat starch. The resultant slurry was stirred for about 15 minutes and filtered. The filter cake was dried in air and then heated to about 160° C. for about 3 hours. The resulting sodium starch phosphate produced a 5% paste with water at 20° C., having a viscosity of 4700 centipoises. After cooking on a steam bath for 10 minutes the viscosity of the paste rose to 21,000 centipoises. The paste was very short compared to alkali metal starch phosphate pastes prepared in the absence of urea.

*Example II*

About 34.5 parts of monosodium phosphate monohydrate and about 67 parts of disodium phosphate heptahydrate were dissolved in 203.5 parts of water. To this solution was added 7.5 parts of urea followed by 180 parts of wheat starch. The resultant slurry was stirred for about 15 minutes and filtered. The filter cake was dried in air and then heated to about 160° C. for about 3 hours. The resulting sodium starch phosphate prepared as a 5% paste with water at 20° C. has a viscosity of 6600 centipoises. After cooking on a steam bath for 10 minutes, the viscosity rose to 18,000 centipoises. The paste was very short compared to alkali metal starch phosphate pastes prepared in the absence of urea.

Having thus fully described and illustrated the character of the invention, what is desired to be secured and claimed by Letters Patent is:

1. In a process for preparing an alkali-metal starch phosphate, which process comprises commingling starch with an aqueous solution containing at least about 2.5% by weight of an alkali-metal phosphate and having a pH between about 3.0 and about 8.0, the proportion of starch being less than about 1½ times the weight of water present in said solution, agitating the resulting slurry for at least about 5 minutes, separating the treated starch from the liquid phase, drying the surface moisture from the treated starch at a temperature below the point at which the starch gelatinizes, and heating the treated starch at a temperature between about 120 and about 175° C. for between about 1 and about 15 hours, the improvement which comprises incorporating in said aqueous solution between about 2 and about 5% by weight of urea prior to treatment of starch therewith, whereby a urea-modified alkali-metal starch phosphate is obtained capable of producing aqueous solutions of increased viscosity.

2. A urea-modified alkali-metal starch phosphate, prepared according to the method of claim 1, and containing between about 1 and about 5% by weight of bound phosphorus, based on the original starch, and between about 1 and about 2 moles of alkali metal per mole of bound phosphorus.

3. In a process for preparing a sodium starch phosphate, which process comprises commingling starch with an aqueous solution containing at least one phosphate salt of sodium, said solution having a pH between about 4.0 and about 7.0 and a molarity with respect to phosphate ion of between about 1 and about 3, the proportion of starch being less than about 1½ times the weight of the water present in said solution, agitating the resulting slurry for between about 5 and about 60 minutes, separating the treated starch from the liquid phase, drying the surface moisture from the treated starch at a temperature below the point at which the starch gelatinizes, and heating the treated starch at a temperature between about 140 and about 170° C. for between about 1 and about 15 hours, the improvement which comprises incorporating in said aqueous solution between about 2 and about 5% by weight of urea prior to treatment of starch therewith, whereby a urea-modified sodium starch phosphate is obtained capable of producing aqueous solutions of increased viscosity.

4. A urea-modified sodium starch phosphate, prepared according to the method of claim 3, and containing between about 3 and about 5% by weight of bound phosphorus, based on the original starch, and between about 1.0 and about 1.7 moles of sodium per mole of bound phosphorus.

References Cited in the file of this patent

UNITED STATES PATENTS

| | | |
|---|---|---|
| 2,252,479 | Beyer | Aug. 12, 1941 |
| 2,412,213 | Groen | Dec. 10, 1946 |
| 2,482,755 | Ford et al. | Sept. 27, 1949 |
| 2,575,352 | Lohmar | Nov. 20, 1951 |
| 2,609,360 | Daul et al. | Sept. 2, 1952 |
| 2,671,779 | Gaver et al. | Mar. 9, 1954 |
| 2,709,638 | Babiarz et al. | May 31, 1955 |

FOREIGN PATENTS

| | | |
|---|---|---|
| 70,237 | Switzerland | May 8, 1912 |